United States Patent [19]

Hall

[11] Patent Number: 4,769,519
[45] Date of Patent: Sep. 6, 1988

[54] FERROMAGNETIC ELEMENT WITH TEMPERATURE REGULATION

[75] Inventor: William D. Hall, Potomac, Md.

[73] Assignee: Metcal, Inc., Calif.

[21] Appl. No.: 3,288

[22] Filed: Jan. 14, 1987

Related U.S. Application Data

[63] Continuation-in-part of Ser. No. 749,637, Jun. 28, 1985, abandoned.

[51] Int. Cl.[4] .......................................... H05B 6/06
[52] U.S. Cl. ............................ 219/10.41; 219/10.75; 219/10.77; 219/497
[58] Field of Search ............... 219/10.77, 10.75, 10.43, 219/10.41, 10.71, 499, 497, 501; 324/57 R, 57 PS

[56] References Cited

U.S. PATENT DOCUMENTS

| | | | |
|---|---|---|---|
| 1,861,687 | 6/1932 | Cooley | 219/10.75 |
| 2,324,525 | 7/1943 | Mittelmann | 219/10.77 |
| 2,400,472 | 5/1946 | Strickland, Jr. | 219/10.75 |
| 3,064,109 | 11/1962 | Peschel | 219/10.77 |
| 3,153,132 | 10/1964 | Greene | 219/10.75 |
| 3,218,384 | 11/1965 | Shaw | 174/40 |
| 3,584,190 | 6/1971 | Marcoux | 219/233 |
| 3,601,126 | 8/1971 | Estes | 128/303.14 |
| 3,686,460 | 8/1972 | Lamparter | 219/10.77 |
| 3,800,218 | 3/1974 | Shekel | 324/57 R |
| 3,924,102 | 12/1975 | Hanekom . | |
| 4,002,882 | 1/1977 | McCutchen . | |
| 4,032,740 | 6/1977 | Mittelmann | 219/10.77 |
| 4,091,813 | 5/1978 | Shaw et al. | 128/303.14 |
| 4,093,839 | 6/1978 | Moliterno et al. | 219/10.71 X |
| 4,185,632 | 1/1980 | Shaw | 128/303.1 |
| 4,211,911 | 7/1980 | Dehn | 219/10.55 F |
| 4,256,945 | 3/1981 | Carter et al. | 219/10.75 |
| 4,499,358 | 2/1985 | Scott | 219/10.77 |
| 4,507,546 | 3/1985 | Fortune et al. . | |
| 4,546,238 | 10/1985 | Ahs . | |
| 4,616,120 | 10/1986 | Maruyama et al. | 219/10.55 A |
| 4,626,767 | 12/1986 | Clappier et al. | 323/280 |

FOREIGN PATENT DOCUMENTS 0087099 8/1983 European Pat. Off. .
2806159 1/1980 Fed. Rep. of Germany .
2527916 12/1983 France .
5084373 7/1985 Japan .
1076772 7/1967 United Kingdom .

OTHER PUBLICATIONS

PCT/GB80/00062 "Methods for Joining Together Thermoplastics Pipes and Pipe Fittings", 1981.
Memorandum: Junior Parties Exhibit 88 in Interference 100,775 dated: 10/19/77. Subject: Preliminary Study of Possibility of Maintaining Constant Temperature in Cooled Zone of RF Blade.
Clinical Oncology (1977) pp. 301-318.
Exhibits 98, 107 and 108 of the Junior Parties; Exhibit 72 of the Party Shaw, and pp. 523-526 and 543-553 of the Junior Parties in Interference 100,775, Carter et al. v. Krumme v. Shaw.

(List continued on next page.)

Primary Examiner—Philip H. Leung
Attorney, Agent, or Firm—Hall, Myers & Rose

[57] ABSTRACT

A ferromagnetic element has current passed through it either by direct electrical connections or by induction. The current through the ferromagnetic element may be far greater than is necessary to heat the element above its effective Curie temperature. As the element is heated and is passing through its effective Curie transition (that is its temperature is rising from below its effective Curie temperature to, or above, its effective Curie temperature) the change in permeability of the element is sensed and the current through the element is cut off. The element then cools. When the temperature falls below the effective Curie temperature, the full current is restored. The heating and cooling process repeats itself indefinitely. The result is that the element is maintained at its effective Curie by a pulsating current fed to the element. The Curie transition may be sensed by directly sensing changes in permeability as by an auto-transformer winding, on the element; or by sensing changes in the power to the element by reason of the change in resistance of the element as it passes through the effective Curie temperature.

36 Claims, 4 Drawing Sheets

4,769,519

Page 2

OTHER PUBLICATIONS

The Voltage Regulator Handbook, published by Texas Instruments, Inc.

Excerpts from Motorola R.F. Device Data, re Broadband Transformers and Power Combining Techniques for R.F.

Excerpts from Texas Instruments, Inc. Typical Application Data for Types SE 555, SA 555, NE 555, Precision Timers.

Excerpts from Texas Instruments, Inc. Linear Integrated Circuits, Types uA741M, uA741C, General Purpose Operational Amplifier.

The ARRL 1985 Handbook published by the American Radio Relay League (1985 Sixty-Second Edition), pp. 30-24 to 30—30.

Memorandum from Phil Carter to Rod Derbyshire dated Aug. 28, 1985, Subject: Review of Hall Patent Application.

FERROMAGNETIC ELEMENT WITH TEMPERATURE REGULATION

RELATED APPLICATION

This application is a continuation in part of prior copending application Ser. No. 749,637, filed June 28, 1985, entitled Temperature Controlled Ferromagnetic Element now abandoned.

BACKGROUND OF THE INVENTION

This invention relates to ferromagnetic elements possessing temperature regulation when electrically heated.

It is old and well known to regulate the temperature of a ferromagnetic element by passing a radio frequency current through it. The current heats the element to its effective Curie temperature where due to a change in permeability of the element, the power drawn by the element declines, and therefore the device will hold its temperature constant. In some prior art devices, the skin depth within which the radio frequency travels increases (and the resistance of the element to the radio frequency current) and the permeability of the element declines as the temperature of the element approaches its effective Curie temperature. The "effective" Curie is the temperature at which the device regulates its temperature and is 50°–100° C. below the actual published Curie temperature. Hereafter, when reference is made to the Curie temperature it should be understood that the reference is to the effective Curie, unless otherwise stated. The current may be fed through the ferromagnetic element directly, as by electrical conductors connected between the element and a source of current, or by induction. However, the known prior art employing a pure ferromagnetic element has the drawback that it will not hold the temperature constant over a wide range of cooling loads.

An improvement in the aforesaid temperature regulation method is shown and described in U.S. Pat. No. 4,256,945, issued Mar. 17, 1981, to Philip S. Carter and John F. Krumme, entitled Alternating Current Electrically Resistive Heating Element Having Intrinsic Temperature Control. This patent teaches that the temperature regulation may be improved if the ferromagnetic element surrounds a copper substrate. Below the effective Curie the current is driven into the ferromagnetic surface layer by strong skin effect forces. When the temperature rises to the effective Curie temperature the skin effect is not strong due to the change in permeability of the ferromagnetic material, and at least some of the current retreats into the copper. This results in a sharp drop in power; since the current is held constant throughout the process. Hence, it is possible to design such a device that holds its temperature constant over a wider range of thermal cooling loads than was the case with the ferromagnetic element.

The Carter-Krumme patent in col. 7 states the effectiveness of the device in terms of $R_{max}$ where $R_{max}$ is the resistance of the device below Curie and $R_{min}$ is the resistance of the device above Curie.

The Carter-Krumme patent teaches that the preferred frequency range is 8 to 20 MHz.

SUMMARY OF THE INVENTION

With the present invention a pure ferromagnetic element is preferably used; although a composite element such as that taught by the Carter-Krumme patent could be used.

According to the present invention, radio frequency current, preferably in the general range of 5 to 20 MHz is passed through the ferromagnetic element, either directly or by induction. The amplitude of the current is selected so as to heat the element well above its effective Curie. An advantage of this invention over the prior art is that it may employ a much larger current than was feasible with the prior art, and, therefore, the load may be brought to its effective Curie more rapidly than with the prior art. The current will quickly increase the temperature of the element to its effective Curie. As the element is increasing in temperature through its Curie transition the permeability of the ferromagnetic element will drop sharply. This sharp drop is sensed, and, when sensed the current to the element is cut-off. The element then cools below the effective Curie and the current is restored so as to again heat the element to its effective Curie. The process then repeats itself, hence a pulsating large current is fed to the element in such a manner as to hold its temperature fairly constant. The sharp drop in permeability may, according to this invention be sensed in several different ways. On such way is to have the winding of an auto-transformer around the ferromagnetic element. Another way is to sense the change in power drawn by the ferromagnetic element, since the device may be so designed that the power will decline when the permeability declines. When the power sharply declines the current is cut-off for a brief period and is then restored.

Arrangements according to the invention will now be further described by way of example, and with reference to the accompanying drawings.

DETAILED DESCRIPTION OF THE INVENTION

Figure 1:
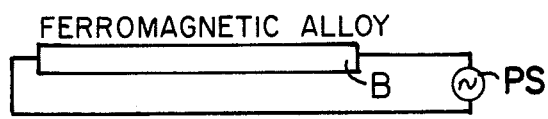
FIG. 1 is a schematic diagram of a prior art arrangement wherein the RF current is fed through a ferromagnetic element by direct electrical connection thereto.

FIG. 1 illustrates a prior art ferromagnetic strip B which may be 0.010 inches thick and 0.2 inches wide, composed of nickel-iron alloy having a permeability of over 100 and an effective Curie temperature in the range of 150° C. or more. The constant current power supply PS is capable of delivering sufficient power to the strip to heat it well above the effective Curie temperature, for example 70° C. above the effective Curie. If then the current is turned on, the strip B will be heated to temperature T (FIG. 3) which is say 70° C. above the effective Curie C. If now a source of cooling fluid, for example gaseous carbon dioxide is passed over strip B in progressively increasing quantity the temperature will fall along line E to level C and will remain there until ultimately the cooling is so great that the temperature will fall off along tail line D.

Figure 2:
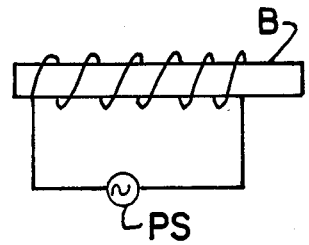
FIG. 2 is a schematic diagram of a prior art arrangement wherein the RF current is fed through a ferromagnetic element by induction.

FIG. 2 illustrates a similar prior art arrangement in which current is induced in ferromagnetic strip B by induction. This device will function in the same way as the device of FIG. 1.

In FIGS. 1 and 2, if the amplitude of the constant current is reduced so as to reduce the initial temperature T, say from 70° C. above the effective Curie temperature, to say 10° above the effective Curie temperature, the flat part C of the curve will be greatly shortened and tail D will occur at a much smaller cooling rate.

The present invention avoids the portion E of the curve above the effective Curie temperature and also either avoids tail line D or at least postpones it to such a high cooling rate that it is no problem.

Figure 4:
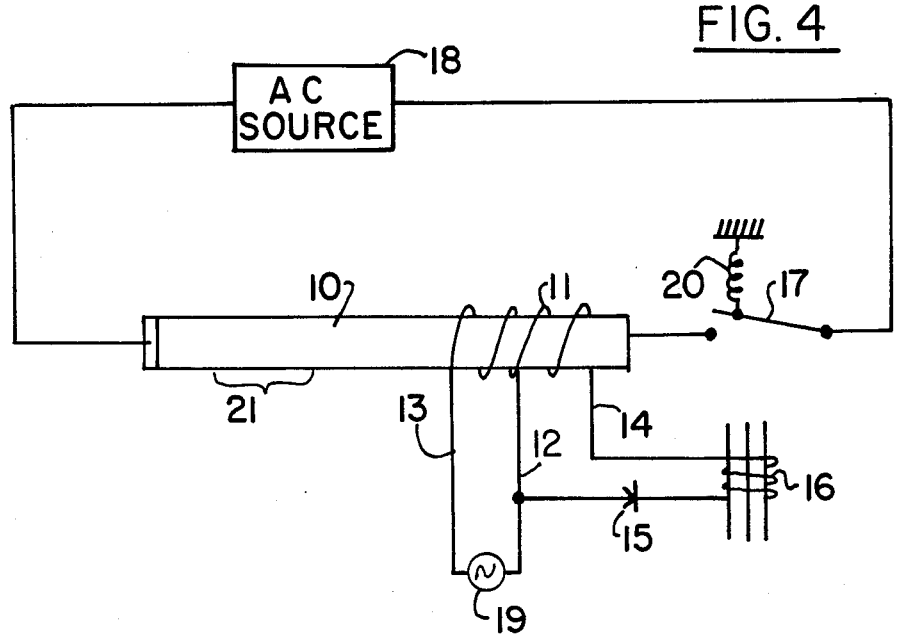
FIG. 4 is a schematic diagram of one form of the present invention.

Referring to FIG. 4, a ferromagnetic strip or bar 10 has a diameter or thickness of at least several thousandths of an inch. The configuration of element 10 may vary depending on the desired end use. For example, if the end use is a soldering iron, element 10 may have the shape of a soldering iron.

A small pick-up coil 11 is adjacent to, or around a part of, ferromagnetic strip, bar or rod 10. Coil 11 will function as an auto-transformer. The left half of the coil 11 is the primary and the right half of the coil 11 is the secondary. When the ferromagnetic member 10 is below Curie the primary of coil 11 is fed by a 60 Hz alternating current source 19 such as the secondary of a small transformer fed by a 60 Hz power line. The voltage of source 19 may be in the range of 8 to 24 volts. The control relay 16, 17 will be energized by the voltage or current induced in the secondary of auto-transformer 11 and will close the circuit to ferromagnetic member 10 when the ferromagnetic member 10 is below Curie. That is, below Curie, the ferromagnetic member 10 has high permeability and current will be induced in the secondary of auto-transformer 11. The secondary of auto-transformer 11 applies an a.c. voltage across wires 12 and 14. This voltage is rectified by rectifier 15 and feeds relay coil 16, attracting armature 17 to close a circuit from source 18 through ferromagnetic member 10. The source may be in the range of 5 to 20 MHz, for example, and feeds sufficient RF current through member 10 to heat it well above Curie. As the member 10 is heated near or above Curie the auto-transformer 11 is no longer effective since the permeability of member 10 has dropped toward unity, hence the voltage in the secondary of the autotransformer falls. Then, the relay coil 16 is deenergized and armature 17 opens the circuit under the pull of spring 20. Next, the current to the ferromagnetic member 10 from R.F. source 18 is cut off. The ferromagnetic member 10 then cools and when its temperature falls below Curie the autotransformer 11 again becomes operative due to the high permeability of member 10. The secondary of auto-transformer 11 now puts out full voltage, the relay 16, 17 closes and current from source 18 is again passed through member 10 to heat it to Curie. The cycle then repeats over and over.

Solid state controls may replace parts 15, 16, 17.

The member 10 may be of high permeability such as Invar, Alloy 42, or a ternary alloy composed of 45% nickel, 46% iron and 9% molybdium.

The parameters such as the amplitude of the current from source 18, time delay etc. of relay 16, 17 may be selected so that the relay 16, 17 opens and closes rapidly (several times a second). In the solid state version, the time delay of the parts will be selected to get the proper frequency for the opening and closing of the solid state switch corresponding to relay 16, 17. If then there is a high rate of extraction of heat from member 10 the relay 16, 17 will be closed longer than it is open etc. But if one section 21 of the member 10 has much more heat extracted therefrom than is extracted from other equally wide sections, the section 21 will receive more heat from the current as will be explained. In such case, the section 21 will remain far below Curie and will not rise above Curie when the relay armature 17 is closed. Therefore, the skin depth of the current in section 21 will remain smaller than for the remainder of member 10. Hence, section 21 will have higher resistance per unit of length than the rest of member 10. Since the same current traverses the entire length of member 10, section 21 will get more heat per unit length, and thus provide more heat to offset the fact that there is greater extraction of heat from section 21.

R.F. source 18 may be a constant current source but this is not necessary. The fact that it is disconnected from the load above Curie is sufficient control over the current.

A key point is that means are employed to detect the transition from below Curie to Curie and in response to detecting that transition the current thru the ferromagnetic bar is cut off. If the device is arranged to cycle on and off, and if the "off" periods are kept of short, the device should hold its temperature quite constant.

In connection with FIG. 4, it is preferable for the relay 16, 17 to completely disconnect the source 18 from the ferromagnetic strip 10. However, it would not depart from the broader aspects of the invention to reduce the current to the ferragentic element 10, when relay 16, 17 opens, instead of cutting the current clear off. This may be accomplished by placing a resistor across the contacts of relay 16, 17.

Figure 5:
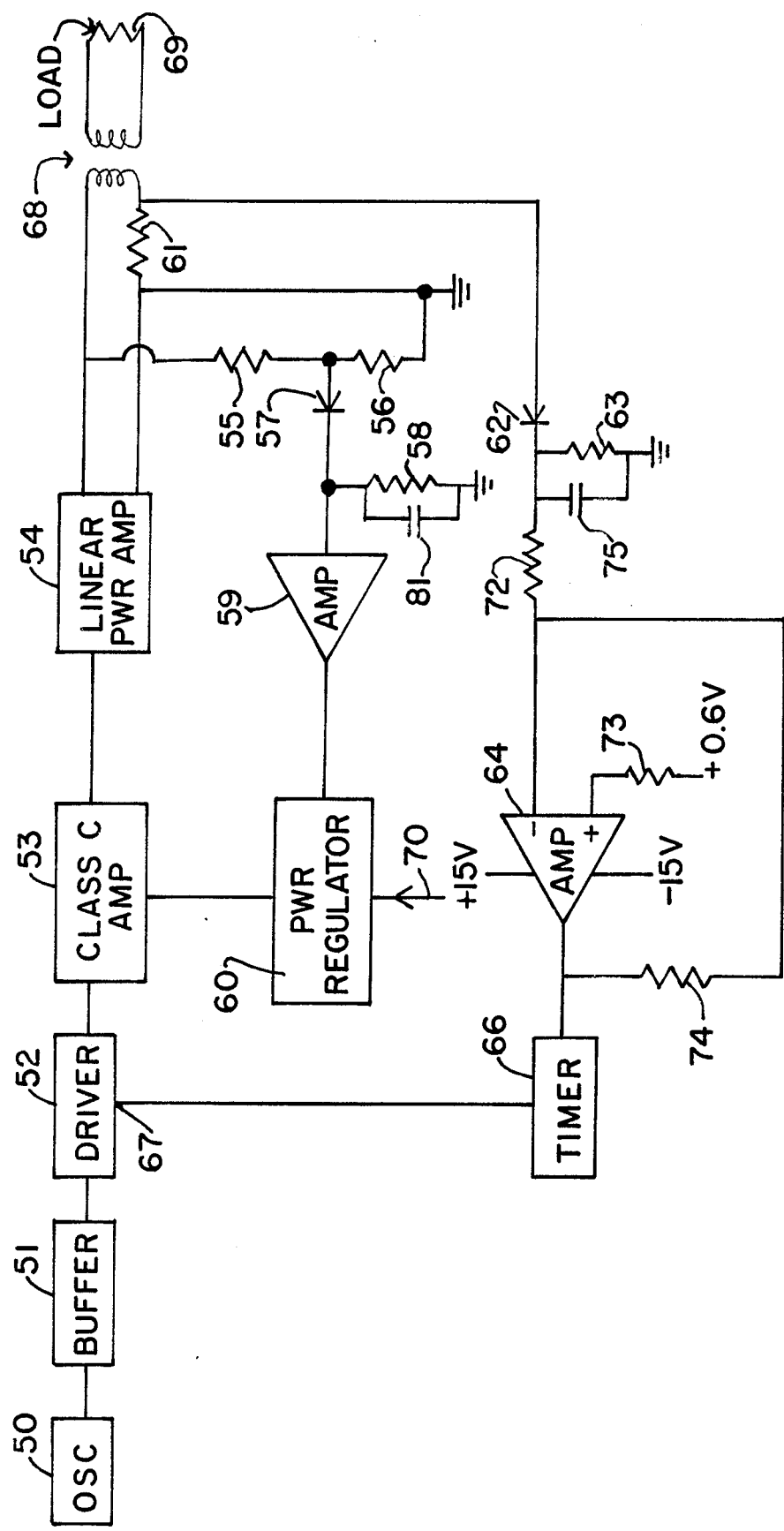
FIG. 5 is a schematic diagram of another form of the present invention.
Figure 6B:
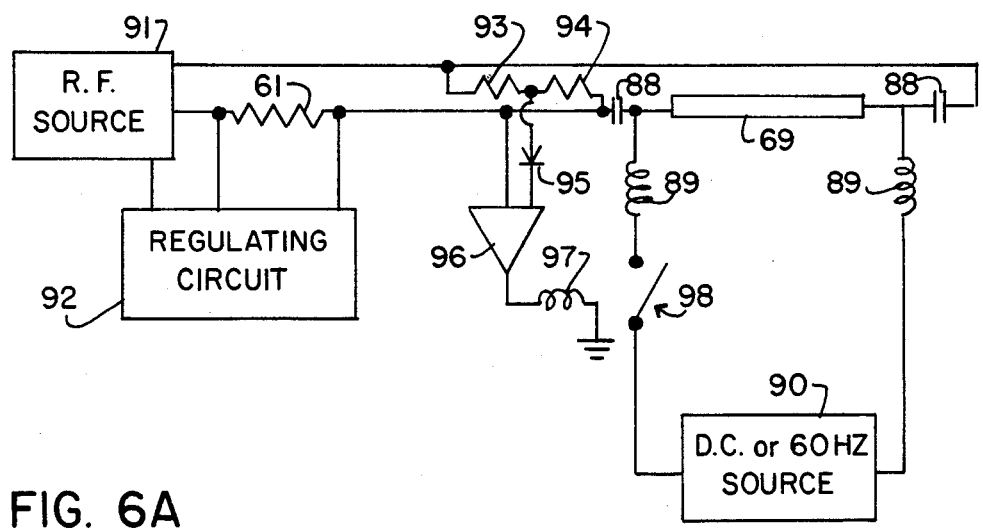
FIG. 6B a schematic diagram of a modified form of FIG. 6.
Figure 6A:
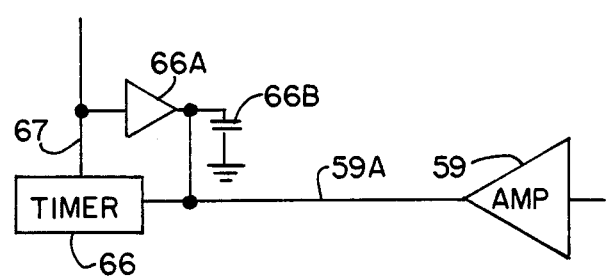
FIG. 6A shows a modified form of FIG. 6.
Figure 6:
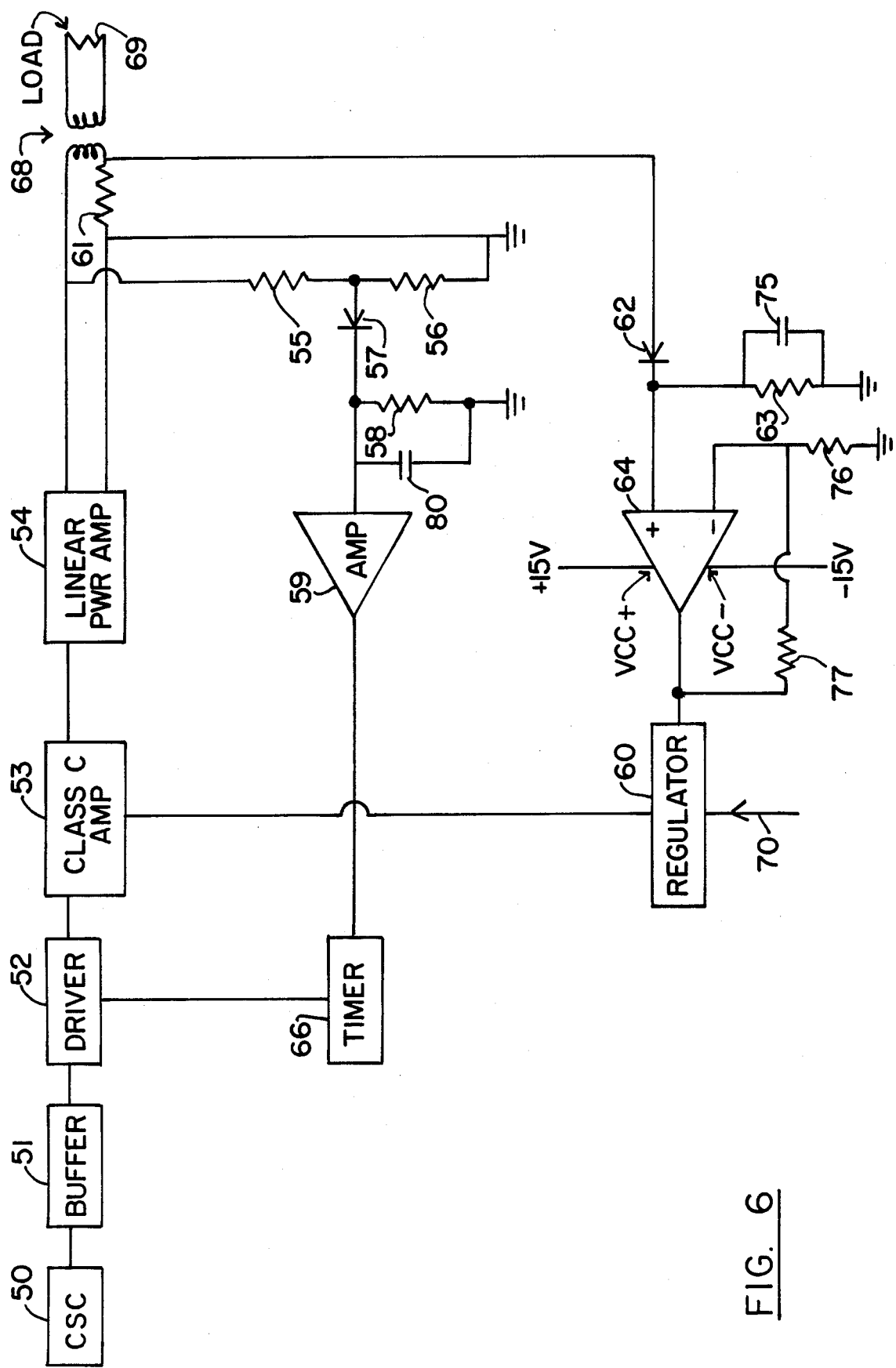
FIG. 6 is a schematic diagram of still another form of the present invention.

FIGS. 5 and 6, illustrate a different way of sensing the Curie transition. In these figures the change in power, that occurs when the temperature increases through the Curie transition is sensed, and in response to sensing that change in power, the current to the ferromagnetic element is either cut-off or reduced.

In both FIGS. 5 and 6 the load 69 is the high permeability ferromagnetic element and may have the composition, shape, and size described above, or as desired for any given end use.

FIG. 5 illustrates a constant voltage power supply for use with the invention. This power supply has conventional oscillator 50, conventional buffer 51, conventional driver 52, and conventional class C amplifier 53, stages. While a wide variety of such equipment is available, one suitable form is shown in The ARRL 1985 Handbook (62nd Ed., 1985), published by the American Radio Relay League, Chapter 30, pages 30-24 to 30-26. A copy of the applicable pages of this handbook was filed with the parent application Ser. No. 749,637 of which is a continuation in part. The driver 52 has an input to key the same on and off and this corresponds to the key jack J1 on page 30-24 of said handbook. Preferably, the driver 52 is keyed by the contacts of a small fast electromagnetic or solid state relay (not shown) in a conventional fashion; the relay coil being energized by the pulses on wire 67 from timer 66. Alternatively the output 67 of timer 66 may bias the driver 52 off.

The linear power amplifier 54, is optional, and may be any, of many, suitable linear amplifiers, for example it may be the 140 Watt Solid State Linear Amplifier, shown on pages 30-27 to 30-30 of said ARRL 1985 Handbook. See also the Motorola RF Data Manual (3rd. Ed., 1983), pages 4-194 to 4-199. The output of linear power amplifier 54 is fed through resistor 61, which feeds impedance matching transformer 68 in which turn feeds the load 69.

The voltage at the output of the linear power amplifier 54 is held constant by the components 55–60 as follows. Resistors 55 and 56 form a voltage divider across the output of power amplifier 54. The diode 57 feeds resistor 58, capacitor 81, and amplifier 59, so that the output of the latter reflects the voltage at the output of power amplifier 54. That output feeds power regulator 60 which may be Texas Instruments, INc. Type LM 117, described on pages 99 to 103 of The Voltage Regulator Handbook published by Texas Instruments, Inc. A copy of the applicable pages of this handbook was filed with the parent application Ser. No. 749,637, of which this application is a continuation in part. This regulator 60 controls the main power input circuit 70 to the Class C amplifier 53 to thus raise or lower the output voltage thereof as necessary to keep the output voltage of linear amplifier 54 fairly constant. This regulator 60 has a built-in conventional standard reference voltage which is compared to the voltage at the output of amplifier 59, and the regulator 60 then functions to control the input voltage to Class C amplifier 53 so as to hold the voltage at the output of linear amplifier 54 constant. The voltage control elements 55 to 60 and 81 are unnecessary in those cases where the voltage of the radio frequency source remains sufficiently constant that elements 55 to 60 are not necessary.

If now the impedance of ferromagnetic load element 69 drops due to a rise in temperature into, or through, the Curie transition, the current through resistor 61 increases and the voltage at the input of diode 62 increases thereby increasing the voltage at the negative (−) input of operational amplifier 64, the output of which feeds timer 66 with a decreasing voltage which in turn opens the keying circuit of driver 52 turning off the driver 52, the Class C amplifier 53 and the linear power amplifier for a time interval between 0.1 and 0.5 seconds; this time period being manually adjustable by varying said timer 66. At the end of the selected time interval the driver 52 is no longer turned off by a signal on wire 67 and hence the driver is turned on, and power to the load 69 resumes. Current will again flow through resistor 61 to feed the load 69 and when the load impedance again drops the above process will repeat itself shutting off the power. In this way the power to the load 69 will pulsate as required.

Timer 66 has a built in standard reference voltage which is compared with the voltage at the output of amplifier 64, and the timer 66 is triggered to start its time period when the voltage at the output of amplifier 64 becomes negative with respect to the standard reference voltage of timer 66. When this happens the timer 66 applies a pulse to wire 67 to cut-off all power at the output of linear amplifier 54.

The timer 66 of FIG. 5 may be Type 555 manufactured by Texas Instruments, Inc., and the manufacturer's data sheet for this timer 66 is being filed with said parent application Ser. No. 749,637, of which this application is a continuation in part. When this form of timer is used the input signal is fed into the Trigger (pin 2) of the timer 66.

The impedance matching transformer 68 in FIG. 5 may be designed and/or selected according to conventional practices such as those described in said Motorola RF Device Data manual pages 4-145 to 4-153, or said ARRL 1985 Handbook, FIG. 44, page 30-28.

The resistance values of the various resistors for FIG. 5 may be as follows; it being understood of course that changes are necessary for different designs:

| Resistor | Ohms |
| --- | --- |
| 55 | 1000 |
| 56 | 10 |
| 58 | 5600 |
| 61 | 0.01 |
| 63 | 5600 |
| 72 | 1000 |
| 73 | 5900 |
| 74 | 56000 |
| 76 | 7800 |
| 77 | 20000 |

Capacitors 75, 80 and 81 may have a capacity of 0.001 mfd.

The 555 timer is actuated to start its time period when its trigger input is fed with a declining voltage that falls below the built-in small positive threshold of the timer 66. This condition is met in FIG. 5 assuming that the amplifier 64 is biased to provide the desired trigger voltage. As soon as the declining output voltage of amplifier 68 passes the threshold of timer 66 the radio frequency power is cut off and therefore the current through resistor 61 falls to zero. Therefore, the output of amplifier 64 rises above the threshold of timer 66 and remains there until not only the pulse at the output timer 66 expires but thereafter until there is a sufficient increase in the current through resistor 61 to again trigger timer 66 to start a new timing period. The above overall cycle then repeats itself, providing a pulsating or intermittent current to the load 69 as required to provide a constant temperature.

If a simple system is desired the parts 64, 65, 72, 73 and 74 may be omitted and the output of rectifier 62 fed directly to driver 52 to bias it off (or open a relay in its keying circuit) when the voltage at rectifier 62 rises. Further simplicity may be achieved by omitting the constant voltage regulating circuit 55 to 60 and 81 when the power supply 5-54 is of the usual type which has a fairly constant voltage at its output.

Figure 5A:
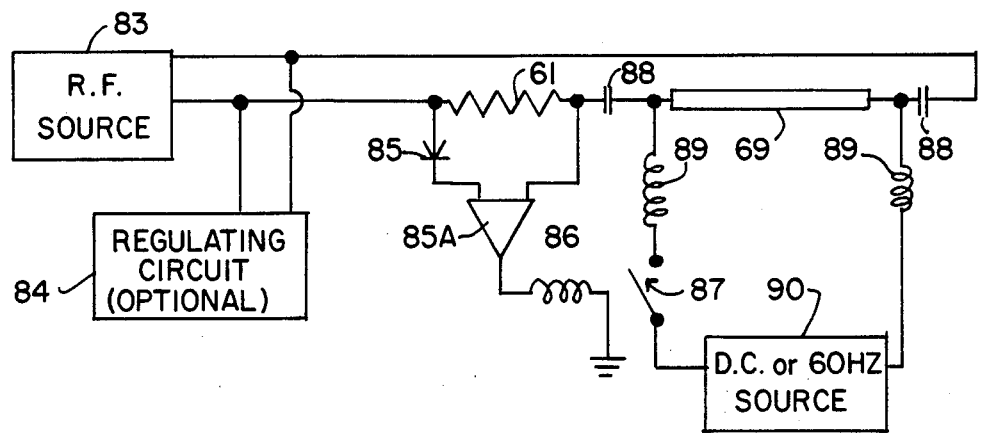
FIG. 5A is a modified form of FIG. 5.

FIG. 5A is a further modified form of FIG. 5 in which the radio frequency source 83 has very low power compared to the source 54 of FIG. 5, and the main heating power is supplied by the d.c. or 60 Hz source 90 compared to the source 54 of FIG. 5. The frequency of source 83 is high enough in the megahertz range so that its output current increases substantially when the high permeability ferromagenetic strip 85 increases in temperature and approaches the effective Curie temperature. If desired, the output voltage of source 83 may be controlled, or held constant, by a voltage regulating circuit 84 that is the same as or similar to the circuit 55 to 60 of FIG. 5; however in many cases this regulator 84 is not necessary since a simple low power r.f. signal generator usually has a fairly constant output voltage without a regulator. The current from source 83 is for control purposes and need not, and usually is not, sufficient to substantially heat ferromagnetic element 69. The main source of heating current for element 69 is the source 90 which may operate at any frequency but to save cost it would preferably be a direct current source or a low frequency one such as 60 Hz. Source 90 feeds the ferromagnetic element through the contacts 87 of normally closed relay 86, 87 which may be an electromagnetic relay (with a spring normally biasing it open) or its solid state equivalent. Capacitors 88 isolate the r.f. source 83 from the source 90, and inductors 89 isolate the source 90 from the radio frequency currents. Suitable components such as rectifier 85 and amplifier 85A are used to interconnect resistor 61 to coil 86.

FIG. 5A operates as follows. The source 83 continuously passes a radio frequency current through ferromagnetic element 69. When the element 69 is well below Curie the element 89 has a relatively high resistance and the voltage drop across resistor 61 is insufficient to open the normally closed relay 86, 87. Therefore, a large current from source 90 is fed through relay contacts 87 to the ferromagnetic element 69 heating the same. When the element 69 is heated to the Curie transition the permeability of element 69 falls, its skin depth increases and its resistance decreases. Hence, the current through resistor 61 increases, and the current through coil 86 increases, opening the relay 86, 87. The current from source 90 is, therefore, cut off, the element 69 cools, the permeability of element 69 rises, the resistance of element 69 increases, and the current through resistor 61 falls. Relay 86, 87 then closes. The above described cycle repeats itself over and over holding the current at element 69 relatively constant. Advantages of FIG. 5A are lower cost and lower possible radiation.

FIG. 6 will next be described.

The power generating stages 50 to 54 in FIG. 6 are essentially the same as for FIG. 5, although they are controlled in a different way; and therefore it is unnecessary to further describe those stages.

The current from the output of power amplifier 54 to the load 69 is held constant by components 60, 62, 63, 64, 70, 75, 76 and 77 as follows. When the current through resistor 61 increases the voltage drop across that resistor 61 is fed to the input of operational amplifier 64 whose output controls power regulator 60 (which may be Texas Instruments, Inc. Type LM 117 described above). The power regulator 60 controls the voltage on wire 70 fed to Class C amplifier 53 to thus hold the output current of power amplifier 54 constant. As stated in connection with FIG. 5 the regulator 60 has a built-in standard reference voltage which is compared with the voltage at the output of amplifier 64, and the regulator 60 functions to keep the two voltges the same and thus keep the current at load 69 constant.

When the resistance of the load 69 (FIG. 6) falls, due to a rise in temperature into, or through, the Curie transition, the voltage at the output of power amplifier 54 also falls (due to the constant-current circuit 60, 62, 63, 64), and this voltage drop is sensed at the positive (+) input of operational amplifier 59. The change in output of that amplifier is sensed by timer 66 which then places a short pulse on wire 67 which opens the keying circuit of driver 52 and shuts off all power at the output of power amplifier for a predetermined time interval, for example, between 0.1 and 0.5 seconds (the timer 66 may be provided with a manual adjustment to enable one to select the time interval he wants). When the time interval is up, the power is restored, and the above described heating-cooling cycle repeats itself. This repeating of the cycle continues as long as desired, with the result that a pulsating current is applied to the load 69 to hold its temperature constant. The timer 66 may have a built-in standard reference voltage which is compared with the voltage at the output of amplifier 59. When the voltage at the output of amplifier 59 becomes negative with respect to the reference voltage, the timer 66 cuts-off driver 52 for a predetermined time interval as explained in connection with FIG. 5.

If the 555 timer, described above, is employed for timer 66 of FIG. 6 it is desirable for the voltage at the input (trigger) of the timer to become negative with respect to the reference (threshold) voltage of the timer; and to then again return to a voltage above that of the reference (threshold) value before the expiration of pulse at the output of the timer 66. This return voltage may be provided by one skilled in the art in many ways. One way is to insert suitable means in the output of amplifier 59 (FIG. 6) to produce a trigger pulse of proper shape to trigger the timer 66. Another way is shown in FIG. 6A wherein a feedback circuit comprising amplifier 66A and capacitor 66B provides a signal, from the positive going output pulse of timer 66, to the trigger input of that timer. The capicitor 66B holds the voltage at the trigger input of timer 66 above its reference (threshold) value for a sufficient timer period to allow the driver 52, Class C amplifier 53 and power amplifier 54 to apply full power to the load, so that the output voltage of amplifier 59 will be high enough to hold timer 66 off as long as the temperature of element 69 is below the Curie transition.

A system embodying the feedback circuit 66A of FIG. 6A works in the same as the circuit of FIG. 6 except that the feedback circuit of FIG. 6A has been added. Such a system operates as follows. When the load 69 is below Curie the current to it through resistor 61 is held constant by the parts 60, 62, 63, 64, 70, 75, 76 and 77. When the temperature of the load 69 approaches Curie the resistance of the load declines and the voltage fed to the positive (+) input to amplifier 59 declines. When the output voltage of amplifier drops enough so it becomes negative with respect to the positive reference (threshold) voltage at the trigger input of timer 66, the timer 66 produces a pulse on its output turning off driver 52 and cutting off current to the load for the predetermined timer period for which the timer is set. At the same time, the voltage through amplifier 66A returns the voltage on wire 59A to a value above the reference (threshold) voltage of the trigger input of the timer 66 and (due to capacitor 66B) holds the voltage at said trigger input above the reference voltage for a period a little longer than the time during which the timer 66 holds driver 52 off.

Therefore, at the expiration of the duration of the pulse output of timer 66, the radio frequency signal generator 52, 53, 54 resumes its constant current output through resistor 61 to load 69. The voltage across voltage divider 55, 56 is again high since the load 69 cooled somewhat while the timer 66 held driver 52 off. Thus, full power is fed to load 69. The temperature of the load 69 again rises, causing the voltage at the input of amplifier 59 to fall and driver 52 is again cut off. The above cycle repeats itself indefinitely thus producing a series of pulses through resistor 61 to load 69 and holding the temperature of the load fairly constant. The upper temperature of load 69 is the Curie temperature and the lower temperature is determined by the reference voltage of the trigger of timer 66. Thus, when it is stated that the load temperature is held constant it is means that it is held within limits such as just described.

The modified form of FIG. 6B has a constant current radio frequency system 91, 93, 94, 95, 96, 97 to sense the resistance of the load 69 to radio frequency currents, and thus sense the Curie transition. When the temperature of the load 69 falls below Curie, a d.c. or low frequency (60 Hz) source 90 is connected across the load 69. This latter source 90 is disconnected from the load 69 when the temperature rises to Curie.

The low power radio frequency source 91 has a constant current output. If the resistance of resistor 61 is sufficiently high it may keep the output current from source sufficiently constant that no further regulation is needed. If further regulation is needed, a regulating circuit 92, when used, may conform to the circuit 60, 62, 63, 64, 70, 75, 76, 77 of FIG. 6. The power output of source 91 is insufficient to provide significant heat to load 69, since source 90 is relied on to provide the heating current for the load 69.

As was the case with FIGS. 5, 5A, 6, and 6A, the load 69 is a ferromagnetic strip or element of such high permeability, and of such size that the radio frequency current from source 91 will have a much greater skin depth at Curie than at temperatures well below Curie. In this regard source 91 preferably has a frequency above 5 MHz. Hence, as the temperature of load 69 approaches Curie, its resistance to the high frequency current from source 91 declines enough so that the decline may be sensed by elements 93, 94, 95, 96 and 97.

In FIG. 6B, when the temperature is well below Curie the resistance of load 69 to the radio frequency current from source 91 is high. Therefore, the constant current from source 91 flowing through the high resistance load 69 places a large voltage across resistor 94. The high voltage across resistor 94 is rectified by rectifier 95 and fed to amplifier 96 the output of which closes normally open electromagnetic relay 97, 98 or its solid stated equivalent. Hence, the d.c. or 60 Hz source 90 feeds heating current to load 69. The heating current may be quite large so as to heat the load to Curie in a very short time, for example a few seconds.

When the load 69 reaches Curie, its resistance declines, the voltage across resistor 94 declines and the voltage across relay coil 97 is inadequate to hold the relay 97, 98 closed. The source 90 is then disconnected from the load 69 until the relay 97, 98 again closes. The above cycle repeats itself supplying a pulse of current from source 90 to load 69 each time the relay 97, 98 closes. The series of pulses of current holds the temperature of load 69 fairly constant.

The operational amplifiers 59 and 64 of both FIGS. 5 and 6 may be Type uA741M or uA741C, manufactured by Texas Instruments, Inc., and a data sheet describing these amplifiers was filed with the parent application Ser. No. 749,637, of which this application is a continuation in part.

Figure 3:
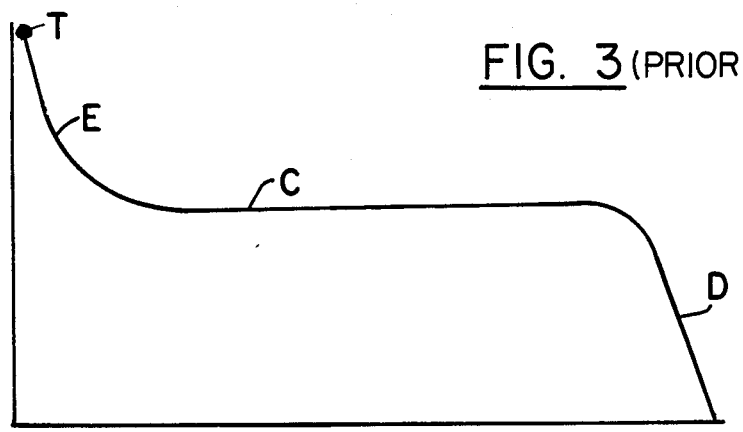
FIG. 3 is a graph of the temperature regulation of the devices of FIGS. 1 and 2.

In connection with FIGS. 4, 5 and 6 it is noted that the current fed to the load 10 or 69, as the case may be, is not limited by the permissible temperature T (FIG. 3). The current that may be applied to the load 10 or 69 may be much higher than is permissible with FIGS. 1 and 2 or with any other known prior art. If a very large cooling load is applied to ferromagnetic elements 10 or 69, the heavy current to those elements will be "on" a much larger percentage of the time than will be the case for a small cooling load. For example, if the cooling load is light, the heavy current will quickly reheat the ferromagnetic load element 10 or 69, after the current is restored by the closing of relay 16, 17 or by the expiration of the time interval of timer 66. But if the cooling load is very heavy the time period for heating the ferromagnetic load element after the current is turned on will be longer than was the case for the light load.

Thus, with the present invention, instead of the curve T, E, C, D of FIG. 3, which is typical of the prior art, the curve would consist of a single horizontal substantially straight line at the effective Curie temperature C.

Another advantage of the invention over the prior art referred to above, is that it will work over a very wide band of frequencies. For example, the device of FIG. 4, will work, even if power supply 18 has a d.c. output or has an output frequency as low as 60 Hz or even lower. In such a case the invention would lose the value of providing greater heat to a limited section 21 (FIG. 4), that is cooled more than other sections.

The feature of providing increased heating to a limited section such as 21, is applicable to all forms of the invention (FIGS. 4, 5 and 6), if the frequency is high enough to provide the necessary change in skin depth. However, in connection with FIGS. 5 and 6 the frequency and the size of the ferromagnetic element should be so related that there is a substantial change in skin depth, due to the change in permeability, as the temperature goes through the Curie transition if a section such as 21 is to get added heat when it is cooled. A strip several thousandths of an inch thick will meet this requirement in the 8–20 MHz range. For any frequency the ferromagnetic load may be several skin depths thick, for example, to meet this requirement.

An advantage of the present invention over the prior art is that impedance matching poses no problem at least in some forms of the invention. In contrast, impedance matching is a serious problem in the prior art; for example in said Carter-Krumme patent the resistance of the load may be 40 times as high below Curie as it is at Curie. Hence, if the impedance is matched at temperatures below Curie it is not matched at the Curie temperature. This can result in large losses in teh power supply including any power transmission line for feeding the load. However, in the present invention the impedance need only be matched at temperatures below Curie since the current is turned off when the temperature reaches Curie.

The change in skin depth during the Curie transition will result in a change in resistance of the load 69, which will result in a change in power, which is sensed and used as a control parameter.

The invention has end uses wherever it is desired to hold the temperature of a strip, rod, bar, or other configuration constant. One such use for example is in soldering as it is often undesirable to overheat apparatus being soldered. Hence, the ferromagnetic element 10 or 69 may be all or part of an element being soldered, or it may be located in contact with an element being soldered.

The ferromagnetic elements 10 or 69 may also be used as heaters to heat chemicals to make sure that chemical reactions occur at predetermined fairly constant temperatures.

I claim to have invented:
1. In a temperature regulating device,
  a ferromagnetic element having a permeability well above one below its effective Curie temperature and a permeability of about one at its effective Curie temperature, first and second power supplies, said first power supply having a relatively small power output as compared to the power output of said second power supply, means for supplying the power output of said first power supply to said element, said first power supply including means for producing an alternating current output having a frequency so high that the skin depth of said alternating current flowing through said element is substantially greater at temperatures below said effective Curie temperature than it is at said effective Curie temperature, means for selectively supplying the output of said second power supply to said element to heat the same, said second power supply having a sufficient power output to heat said element above its effective Curie, and means controlled by the change in skin depth of the alternating current flowing in said element for selectively controlling the power from said second power supply to said element and thereby regulating the temperature of said element.

2. In a temperature regulating device as defined in claim 1 in which said first power supply has a radio frequency output, said second power supply having an output for feeding said element with current which flows through said element to heat said element without substantial skin effect.

3. In a temperature regulating device:

a ferromagntic element having a permeability well above unity at temperature well below the effective Curie temperature of said element, and control means for applying pulses of electric current to said element with each pulse heating said element to tis effective Curie temperature; said element cooling between pulses, said control means including means for sensing the permeability of said element during each pulse and for terminating such pulse when such permability declines to a given value and for sensing the permeability of said element after the cessation of each pulse and for producing the next pulse only after said element has cooled so that its permeability is above said given value.

4. In a temperature regulating apparatus as defined in claim 3, said control means comprising means for holding the temperature of said element constant by controlling the duration of said pulses.

5. In a temperature regulating apparatus as defined in claim 4, wherein the time interval between the end of each pulse and the beginning of the next one is at least a predetermined time period.

6. In a temperature regulating device as defined in claim 3, said means for sensing the permeability of said element including a source which passes radio frequency current through said element and responds to the skin depth of that current to determine the permeability of said element to terminate each pulse when the permeability declines to said given value and to produce the next pulse only after said element has cooled so that its permeability is above said given value.

7. In a temperature regulating device as defined in claim 6:

said pulses of electric current being an alternating current of a frequency much lower than the frequency of said radio frequency current.

8. In a temperature regulating device as defined in claim 7:

said pulses of electric current comprising pulses of current the frequency of which is 60 Hz.

9. In a temperature regulating device as defined in claim 6, said pulses of electric current comprising pulses of direct current.

10. In a temperature regulating device as defined in claim 6, said electric current falling to zero between pulses.

11. In a temperature regulating device as defined in claim 6, said electric current having a substantial amplitude between pulses.

12. Temperature regulating apparatus, for holding the temperature of a heating element substantially constant while such element is subject to varying cooling loads, comprising:

a heating element of the type that when in use is subject to a varying cooling load, said heating element including: a ferromagnetic element having a permeability substantially greater than one when its temperature is below its effective Curie temperature and a permeability on the order of one when its temperature is above its effective Curie temperature, power delivery means feeding an electric current, through said element, of sufficient amplitude which if maintained continuously and indefinitely, would heat said element far above its effective Curie temperature, so that said element has a Curie transition characterized by a change in permeability of said element, and control means including means for supplying power to said element in the form of a series of pulses of current with each pulse rising to said amplitude, said control means comprising means for sensing said permeability during each pulse and at least reducing said electric current to said element to terminate the pulse in response to such pemreability falling to a give value during an increase in temperature in said element;

said control means restoring said electric current to said element to start the next pulse only when said permeability is above said given value due to cooling of said element; whereby a series of pulse is produced, each of which pulses reaches said amplitude, and each of which pulses is of greater duration for larger cooling loads than for smaller cooling loads; said pulses holding said element at said substantially constant temperature.

13. Temperature regulating apparatus as defined in claim 12 in which said power delivery means is directly connected by an ohmic connection to said element to thereby pass said current through said element, said element having a current carrying portion, said current being an alternating current varying at a rate relative to the size of said element so that the current is concentrated along at least one surface of said element below the effective Curie temperature and spreads deeper into the element as the effective Curie temperature is approached so that if one part of the current carrying portion of said element is cooled more than another part of said element the said one part will receive increased heat due to the decreased skin depth of the current in such one part.

14. Temperature regulating apparatus as defined in claim 12 in which said power delivery means comprises means for inducing said current in said element,
said elemenet having a current carrying portion,
said current being an alternating current varying at a rate relative to the size of said element so that the current is concentrated along at least one surface of said element below the effective Curie temperature and spreads deeper into the element as the effective Curie temperature is approached so that if one part of the current carrying portion of said element is cooled more than another part of said element the said one part will receive increased heat due to the decreased skin depth of the current in such one part.

15. Temperature regulating apparatus as defined in claim 12 in which said sensing means comprises inducing magnetization B to said element and detecting the magnetic field H produced thereby.

16. Temperature regulating apparatus as defined in claim 12 in which said sensing means comprises means for detecting a change in the power of said current as the temperature of said element increases and said element undergoes at least part of a Curie transition.

17. Temperature regulating apparatus as defined in claim 16 in which said sensing means comprises means that responds to a change in voltage to detect said change in power.

18. Temperature regulating apparatus as defined in claim 16 in which said sensing means comprises means that responds to a change in current to detect said change in power.

19. Temperature regulating apparatus as defined in claim 12 in which said sensing means includes means for restoring said current to said element after at least a predetermined time interval following the time that said current was at least reduced by said sensing means.

20. The method of temperature regulation, of a heating element subject to a variable cooling load, comprising:
providing said element with ferromagnetic material having a permeability considerably greater than one below its effective Curie temperature and a permeability on the order of one above its effective Curie temperature,
subjecting said element to at least two cooling loads one of which is larger than another one,
passing an electric current, of sufficient amplitude which if fed through said element for a prolonged period will heat said element well above its effective Curie temperature, through said element to heat said element at least to a temperature high enough so that at least a part of the Curie transition takes place,
sensing at least part of said Curie transition and reducing the flow of said current through said element when at least part of said Curie transition is sensed, and
restoring said current through said element to said amplitude,
said sensing and restoring steps recurring alternately to thus provide a pulsating current that holds said element at about its effective Curie temperature and at all times prevents a rise in the temperature of said element substantially above its effective Curie temperature,
said pulsating current comprising pulses of greater time duration for the larger cooling load than for the said another one.

21. The method of temperature regulation of claim 20, comprising:
said current being an alternating current,
the frequency of said alternating current being so related to the size and permeability of said element that the skin depth of the alternating current flow increases when the temperature increases into the Curie transition to thus lower the effective resistance of said element to said alternating current, whereby the power fed to said element changes during the Curies transition,
said sensing step comprising sensing changes in the power of the alternating current fed to said element, to thereby sense at least part of the Curie transition during an increase in the temperature of said element and thereupon reduce the power fed to said element thereby limiting further heating of said element.

22. The method of claim 21 in which said power fed to said element includes the parameters of voltage and current one of which has less percentage variation than the other at temperatures of said element below and during the Curie transition,
said sensing step including the sensing of changes in the other of said parameters to thus ascertain at least a part of the Curie transition and thereupon reduce the power fed to said element and limit the rise in temperature of said element.

23. The method of claim 22 in which the current has the smaller percentage variation, and the change in voltage is sensed to ascertain at least part of the Curie transition.

24. The method of claim 22 in which the voltage has the smaller percentage variation, and the change in current is sensed to ascertain at least part of the Curie transition.

25. The method of claim 20 in which said sensing step comprises applying magnetic induction to said element and sensing the resulting magnetic field in the element to thus determine when the element passes through at least part of the Curie transition.

26. The method of claim 20 in which said sensing step comprises detecting the change in power fed to said element due to at least part of the Curie transition,
providing a power source for supplying said current, and
feeding said current to said element by an ohmic connection.

27. The method of claim 20 in which said current is restored in at least a predetermined time period after it is stopped.

28. The method of claim 20 in which an increase in the permeability of said element is sensed and said current is restored when such increase in permeability is sensed.

29. Temperature regulating apparatus, for holding the temperature of a heating element substantially constant while such element is subject to varying cooling loads, comprising:
a heating element of the type that when in use is subject to a varying cooling load,
said heating element including: a ferromagnetic element having a permeability substantially greater than one when its temperature is below its effective Curie temperature and a permeability on the order of one when its temperature is above its effective Curie temperature, a radio frequency power supply feeding current, through said element, of sufficient amplitude, that if maintained continuously and indefinitely, would heat said element far above its effective Curie temperature, so that said element has a Curie transition, said power supply having an output and also having the parameters of both current and voltage at said output, feedback means for holding one of said parameters, when the current is on, substantially constant at said output, and control means for sensing changes in the other of said parameters for turning said radio frequency power supply off and on to produce a series of pulses, said control means turning said power supply off when the permeability of said element falls to a given value due to the heating of said element.

30. Temperature regulating apparatus as defined in claim 29, in which said control means includes a timer for holding said power supply off for at least a predetermined time after it has been turned off by said control means.

31. Temperature regulating apparatus as defined in claim 30 in which said current at said output is held constant.

32. Temperature regulating apparatus as defined in claimed 29 in which said voltage is held constant.

33. The method of temperature regulation, comprising, providing a ferromagnetic element having a permeability well above unity at temperatures well below the effective Curie temperature of said element, applying pulses of electric current to said element with each pulse heating said element to its effective Curie temperature, allowing said element to cool between pulses, sensing the permeability of said element during each pulse and terminating such pulse when such permeability declines to a give value, and sensing the permeability of said element after the cessation of each pulse and producing the next pulse only after said element has cooled so that its permeability is above said given value.

34. The method of temperature regulation as defined in claim 33 in which each of said sensing steps comprise passing a radio frequency current through said element and responding to the skin depth at which said current flows in order to determine the permeability of said element.

35. The method of temperature regulation as defined in claim 33 in which the current through said element is turned off between pulses.

36. The method of temperature regulation as defined in claim 33 in which there is a substantial current through said element between pulses.

* * * * *

UNITED STATES PATENT AND TRADEMARK OFFICE
CERTIFICATE OF CORRECTION

PATENT NO.   :   4,769,519

DATED        :   September 6, 1988

INVENTOR(S)  :   William D. Hall

It is certified that error appears in the above-identified patent and that said Letters Patent is hereby corrected as shown below:

Claim 33, line 12, change "give" to --given--

Signed and Sealed this

Seventeenth Day of January, 1989

Attest:

DONALD J. QUIGG

*Attesting Officer*     *Commissioner of Patents and Trademarks*